United States Patent
Murthy et al.

(10) Patent No.: US 7,051,039 B1
(45) Date of Patent: May 23, 2006

(54) MECHANISM FOR UNIFORM ACCESS CONTROL IN A DATABASE SYSTEM

(75) Inventors: Ravi Murthy, Fremont, CA (US); Eric Sedlar, San Francisco, CA (US); Nipun Agarwal, Santa Clara, CA (US); Sam Idicula, Foster City, CA (US); Nicolas Montoya, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 478 days.

(21) Appl. No.: 10/259,176

(22) Filed: Sep. 27, 2002

Related U.S. Application Data (60) Provisional application No. 60/378,800, filed on May 7, 2002, provisional application No. 60/326,052, filed on Sep. 28, 2001.

(51) Int. Cl.
*G06F 7/00* (2006.01)
*G06F 17/00* (2006.01)

(52) U.S. Cl. .............................. 707/102; 707/5; 707/8; 707/10; 707/100; 707/103 R; 707/104.1; 709/219; 709/225

(58) Field of Classification Search ................ 707/1–5, 707/8–10, 100–104.1, 200–203, 204; 709/219, 709/225, 229
See application file for complete search history.

(56) References Cited

U.S. PATENT DOCUMENTS

| | | | |
|---|---|---|---|
| 4,993,025 A | 2/1991 | Vesel et al. ................. | 370/94.1 |
| 5,226,137 A | 7/1993 | Bolan et al. ................. | 395/425 |
| 5,295,261 A | 3/1994 | Simonetti .................... | 395/600 |
| 5,404,513 A | 4/1995 | Powers et al. | |
| 5,467,471 A | 11/1995 | Bader .......................... | 395/600 |
| 5,506,991 A | 4/1996 | Curry et al. ................. | 395/800 |
| 5,680,614 A | 10/1997 | Bakuya et al. | |
| 5,724,577 A | 3/1998 | Exley et al. ................. | 395/611 |
| 5,734,887 A | 3/1998 | Kingberg et al. ........... | 395/604 |

(Continued)

OTHER PUBLICATIONS

Hansrudi Noser, et al., "Dynamic 3D Visualization of Database-Defined Tree Structures on the WWW by Using Rewriting Systems," 2000, IEEE, XP-002262516, pp. 247-254.

(Continued)

*Primary Examiner*—Apu Mofiz
*Assistant Examiner*—Jacques Veillard
(74) *Attorney, Agent, or Firm*—Marcel K. Bingham; Hickman Palermo Troung & Becker LLP (57) ABSTRACT

Techniques are provided for facilitating uniform access control to data managed by a database server that can emulate hierarchically organized systems, whether the data is accessed through hierarchical or relational access mechanisms. A database server that can emulate hierarchically organized systems uses separate relational or object-relational database tables to store the content of the resources that belong to a hierarchy (the "content structures") and information that captures the hierarchy (the "hierarchy structures"). Both types of structures contain access control data that define consistent user access privileges. To determine access privileges for a user requesting access to data in the database, access control information is accessed in the hierarchy structures when the request is made through the hierarchical access mechanism, or accessed in the content structures when the request is made through a relational access mechanism. Access control is consistent between the hierarchical or relational access mechanisms because access through either is governed by user access data that reflects the same privileges.

26 Claims, 5 Drawing Sheets

U.S. PATENT DOCUMENTS

| | | | |
|---|---|---|---|
| 5,878,415 A * | 3/1999 | Olds ............................. 707/9 |
| 5,940,591 A | 8/1999 | Boyle et al. ........... 395/187.01 |
| 5,974,407 A | 10/1999 | Sacks |
| 5,987,506 A * | 11/1999 | Carter et al. ................. 709/213 |
| 6,003,040 A | 12/1999 | Mital et al. |
| 6,023,765 A | 2/2000 | Kuhn ......................... 713/200 |
| 6,038,563 A * | 3/2000 | Bapat et al. .................. 707/10 |
| 6,055,544 A | 4/2000 | DeRose et al. |
| 6,061,684 A * | 5/2000 | Glasser et al. .................. 707/9 |
| 6,128,610 A | 10/2000 | Srinivasan et al. |
| 6,141,655 A | 10/2000 | Johnson et al. |
| 6,154,741 A * | 11/2000 | Feldman ........................ 707/9 |
| 6,189,012 B1 | 2/2001 | Mital et al. |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 * | 10/2001 | Toyoshima et al. ......... 707/100 |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,470,344 B1 | 10/2002 | Kothuri et al. |
| 6,487,546 B1 | 11/2002 | Witkowski |
| 6,496,842 B1 | 12/2002 | Lyness |
| 6,539,398 B1 * | 3/2003 | Hannan et al. ......... 707/103 R |
| 6,542,898 B1 | 4/2003 | Sullivan et al. ............. 707/102 |
| 6,571,231 B1 | 5/2003 | Sedlar ............................ 707/1 |
| 6,609,121 B1 * | 8/2003 | Ambrosini et al. ............. 707/3 |
| 6,684,227 B1 * | 1/2004 | Duxbury ..................... 707/203 |
| 6,718,322 B1 | 4/2004 | Brye ............................... 707/3 |
| 6,725,212 B1 | 4/2004 | Couch et al. |
| 6,754,661 B1 | 6/2004 | Hallin et al. ................ 707/100 |
| 6,772,350 B1 * | 8/2004 | Belani et al. ............... 713/202 |
| 6,785,673 B1 | 8/2004 | Fernandez et al. |
| 6,920,457 B1 * | 7/2005 | Pressmar .................... 707/101 |
| 2003/0004937 A1 | 1/2003 | Salmenkaita et al. |
| 2003/0009361 A1 | 1/2003 | Hancock et al. |
| 2003/0065659 A1 | 4/2003 | Agarwal et al. |
| 2003/0093672 A1* | 5/2003 | Cichowlas .................. 713/168 |
| 2003/0101194 A1 | 5/2003 | Rys et al. |
| 2003/0182624 A1 | 9/2003 | Large |
| 2004/0043758 A1 | 3/2004 | Sorvari et al. |
| 2004/0176958 A1 | 9/2004 | Salmenkaita et al. |
| 2004/0225680 A1 | 11/2004 | Cameron et al. |
| 2004/0230893 A1 | 11/2004 | Elza et al. ................... 715/511 |
| 2005/0050058 A1 | 3/2005 | Jain et al. |
| 2005/0050092 A1 | 3/2005 | Jain et al. |

OTHER PUBLICATIONS

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Josephine Cheng, et al., "IBM DB2 XML Extender," IEEE, ICDE '00 Conference, San Diego, Feb. 2000, 128 pages.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Park, Joon S., "Towards Secure Collaboration on the Semantic Web" (2003) ACM Press, vol. 33, Issue 2, pp. 1-10.

Thekkath, Chandramohan A. et al., "Implementing network protocols at user level" (1993) ACM Press, pp. 64-73.

Wallach, Deborah A. et al., "ASHs: Application-specific handlers for high-performance messaging" (1996) ACM Press, pp. 1-13.

* cited by examiner

MECHANISM FOR UNIFORM ACCESS CONTROL IN A DATABASE SYSTEM

RELATED APPLICATIONS

The present application claims priority from the following U.S. Provisional Patent Applications, the entire contents of which are incorporated herein by reference for all purposes:

U.S. Provisional Patent Application No. 60/326,052, filed on Sep. 28, 2001, entitled File Based Access Provided With a Database System, by Eric Sedlar and Viswanathan Krishnamurthy;

U.S. Provisional Patent Application No. 60/378,800, filed on May 7, 2002, entitled SQL Access to Data that Provides a File System Abstraction, by Nipun Agarwal, Ravi Murthy, Eric Sedlar, Sivasankaran Chandrasekar, Fei Ge, Syam Pannala, Neema Jalali and Muralidhar Krishnaprasad.

The present application is also related to the following U.S. patent applications, the entire contents of which are incorporated herein by reference for all purposes:

U.S. patent application Ser. No. 10/260,138, filed on the equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on the equal day herewith, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on the equal day herewith, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Viswanathan Krishnamurthy and Nipun Agarwal;

U.S. patent application Ser. No. 10/260,161, filed on the equal day herewith, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on the equal day herewith, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/256,777, filed on the equal day herewith, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on the equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy;

U.S. patent application Ser. No. 09/167,092, filed on Oct. 5, 1998, entitled DATABASE FINE-GRAINED ACCESS CONTROL, by Chon Hei Lei and Douglas James McMahon; and U.S. patent application Ser. No. 09/589,602, filed on Jun. 7, 2000, entitled PARTITIONED ACCESS CONTROL TO A DATABASE, by Daniel ManHung Wong and Chon Hei Lei.

FIELD OF THE INVENTION

The present invention relates to relational database systems and, more specifically, to techniques for ensuring secure and consistent access to hierarchical and relational data within a relational database system.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

In contrast to hierarchical approaches to organizing electronic information, a relational database stores information in tables comprised of rows and columns. Each row is identified by a unique RowID. Each column represents an attribute or field of a record, and each row represents a particular record. Data is retrieved from the database by submitting queries to a database server that manages the database. The queries must conform to the database language supported by the database server. Structured Query Language (SQL) is an example of a database language supported by many existing database management systems.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. However, some relationally organized systems incorporate features that allow the systems to emulate a hierarchically organized system. This type of emulation is especially desirable when the storage capability and flexibility of a relational system is needed, but the intuitiveness and ubiquity of the hierarchical system is desired.

Relationally organized systems that emulate hierarchically organized systems provide mechanisms that allow access to data as both hierarchically organized data ("hierarchical access mechanisms") or that allow access to data as relationally organized data ("relational access mechanisms"). It is desirable that access to the items of data be controlled consistently, whether accessed through relational access mechanisms or hierarchical access mechanisms. For example, in a relationally organized system that emulates a hierarchically organized system, a user who is not allowed access to a particular item of data that is the hierarchical parent of child items of data, is also not allowed to access the child items through a hierarchical access mechanism. The parent item and child item may be stored in rows of a relational table, which may be accessed through a relational access mechanism by issuing a query that requests data from the table. Access control that is uniform between the hierarchical access mechanism and the relational access mechanism does not permit using the relational access mechanism to access the rows of the relational table that store data for the children items.

Based on the foregoing, it is clearly desirable to provide a mechanism, usable in relational database systems, that provide uniform access control to relationally organized data and hierarchically organized data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for accessing hierarchical information stored in a relational database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are provided for facilitating uniform access control to data managed by a database server that can emulate hierarchically organized systems, whether the data is accessed through hierarchical or relational access mechanisms. According to one embodiment, such a database server uses separate relational or object-relational database tables to store the content of the resources that belong to a hierarchy (the "content structures") and information that captures the hierarchy (the "hierarchy structures"). Both types of structures contain access control data that define consistent user access privileges. To determine access privileges for a user requesting access to data in the database, access control information is accessed in the hierarchy structures when the request is made through the hierarchical access mechanism, or accessed in the content structures when the request is made through a relational access mechanism. Access control is consistent between the hierarchical or relational access mechanisms because access through either is governed by user access data that reflects the same privileges.

Storing Hierarchical Data in a Database System

Figure 1:
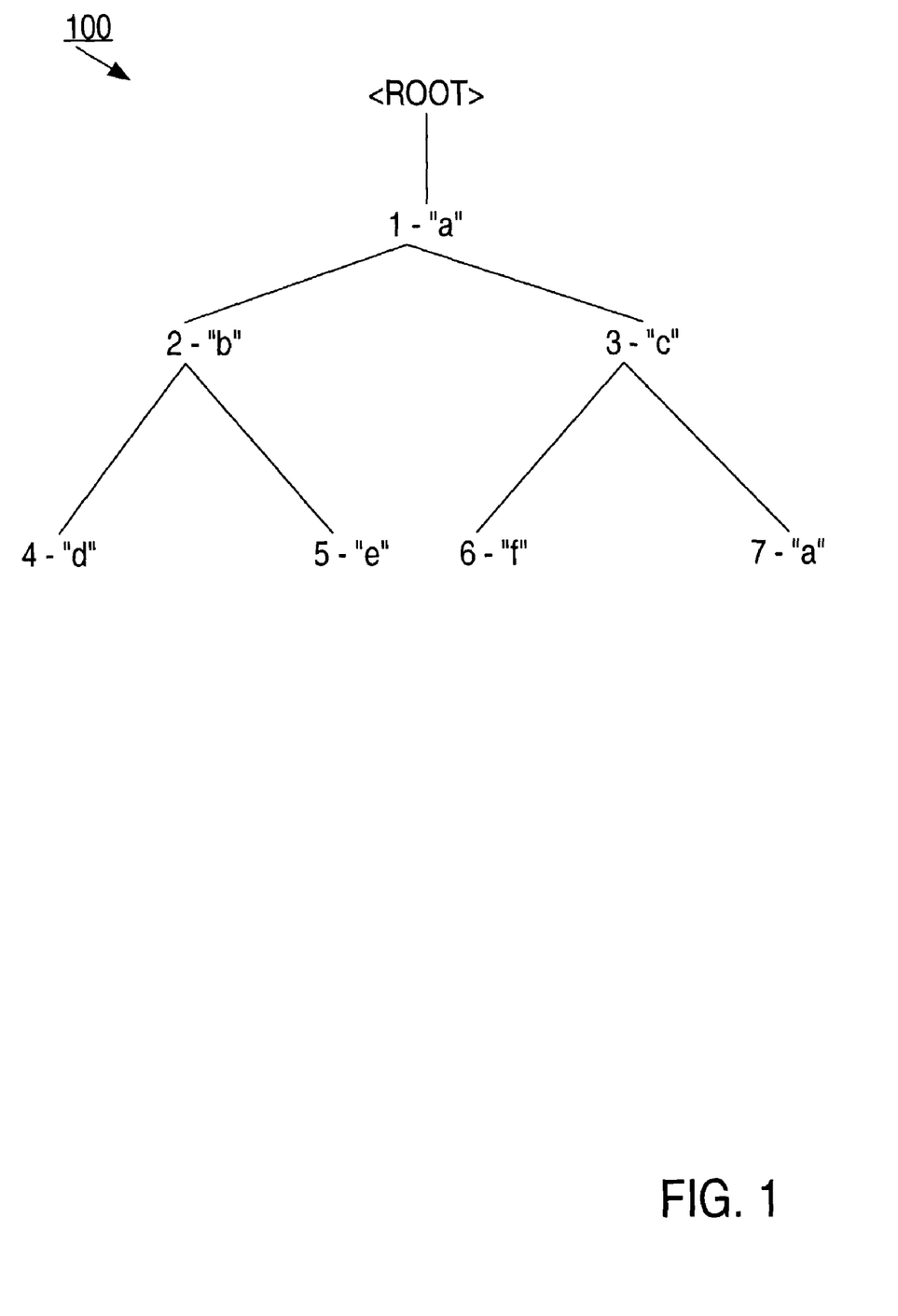
FIG. 1 is a block diagram illustrating an information hierarchy.

FIG. 1 is a block diagram that illustrates a hierarchy 100 that is used in examples that are provided herein to facilitate an understanding of embodiments of the invention. Hierarchy 100 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, and 3 are intermediate nodes, and nodes 4, 5, 6, and 7 are leaf nodes.

In an information hierarchy, the nodes correspond to information. Typically, the piece of information associated with each node will have some form of name, and some type of content. For example, in a hierarchy that corresponds to a hierarchical file system, the nodes will typically correspond to files (where a "folder" or "directory" is one type of file). Each such file will have a name, and some form of contents.

In many situations, the names that are associated with the nodes in a hierarchy need not be unique. In the example shown in FIG. 1, both node 1 and node 7 have the name "a". Though they have the same name, they are separate and distinct nodes, which occupy different positions in the hierarchy and may be associated with completely different content.

Uniform Access Control Architecture

Figure 2:
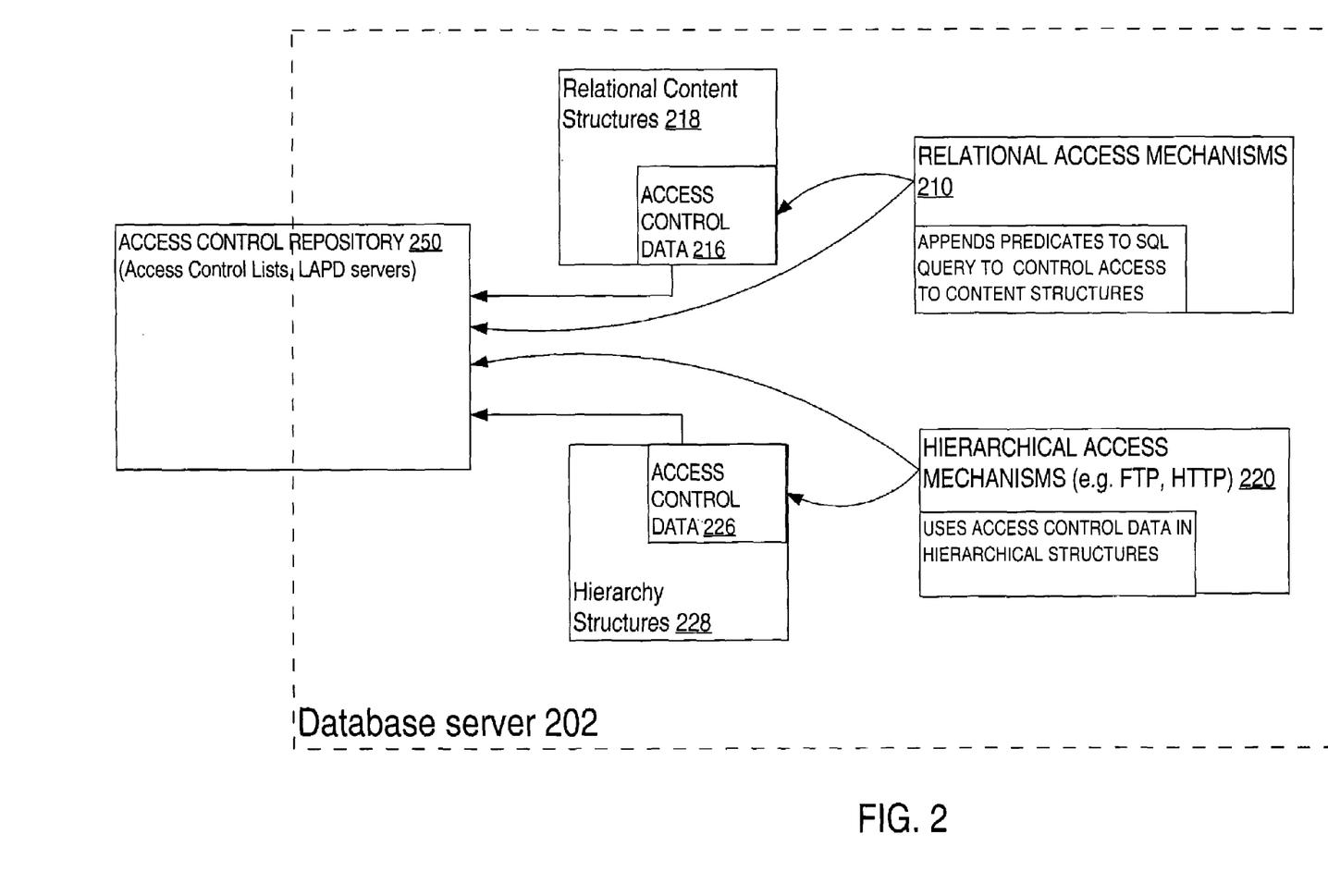
FIG. 2 is a system architecture for providing uniform access control according to an embodiment of the present invention.

FIG. 2 shows a system architecture for providing uniform access control according to an embodiment of the present invention. Referring to FIG. 2, database server 202 includes content structures 218 and hierarchy structures 228. Content structures 218 include access control data 216 and hierarchical structures 228 include access control data 226. Access control data is data used to determine user access privileges, that is, what way, if any, may a user, group of users, or class of users, access a node in hierarchy 100. Access control data may be data that explicitly specifies user access privileges, or may be data that refers to a source of access control data, or a combination thereof. Access control data 216 and 226, in particular, contain identifiers or references to records in access control repository 250. For a given set of users or groups of users, access control data 216 and 226 reflect consistent user access privileges by referring to same records in repository 250.

Records in access control repository 250 identify a set of one or more users or groups of users, and the access privileges for the set or groups. User access privileges include, without limitation, the right to read content of a node, to write content of a node, to define user privileges for the node, to delete the node, and to traverse the node.

Examples of a record in access control repository 250 include (1) an access control list of users or user groups, which may be stored in a row of a table managed by database server 202, and (2) an LDAP ("light directory access protocol") server that follows the LDAP protocol, which stores a list of users and access privileges for the users.

Hierarchical access mechanisms 220 provide access to nodes in hierarchy 100 based on their position within the hierarchy. To provide access to nodes in this way, hierarchical access mechanisms examine hierarchy structures 228 to determine the nodes' position within the hierarchy, and then access either hierarchy structures 228 or relational content structures 218 to retrieve the content or information about the nodes. Examples of such mechanisms include (1) FTP ("file transfer protocol") server, which permits access to files in a particular directory, (2) an HTTP ("hypertext transfer protocol") server that permits access to "web" resources based on a URL, and (3) a query execution mechanism that executes statements written in SQL that contain hierarchical operators and that may access a hierarchical index or other hierarchy structures to compute the query. Examples of hierarchical operators are described in U.S. patent application Ser. No. 10/260,138, filed on the equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge. Examples of hierarchical indexes are described in U.S. patent application Ser. No. 10/260,381, filed on the equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

In the course of providing access to the nodes, hierarchical access mechanisms determine user access privileges. These determinations are based on examining access control data 226 and/or access control repository 250.

Relational access mechanisms provide relational access to content structures. Examples of relational access mechanisms include a query execution mechanism that computes queries written in SQL or another database language. Relational access mechanisms 210 do not use hierarchy structures 228 to process database statements or compute queries.

In the course of providing access to the nodes, relational access mechanisms 210 determine user access privileges. These determinations are based on examining access control data 216 and/or access control repository 250.

Illustrative Hierarchy Structures

Figure 3:
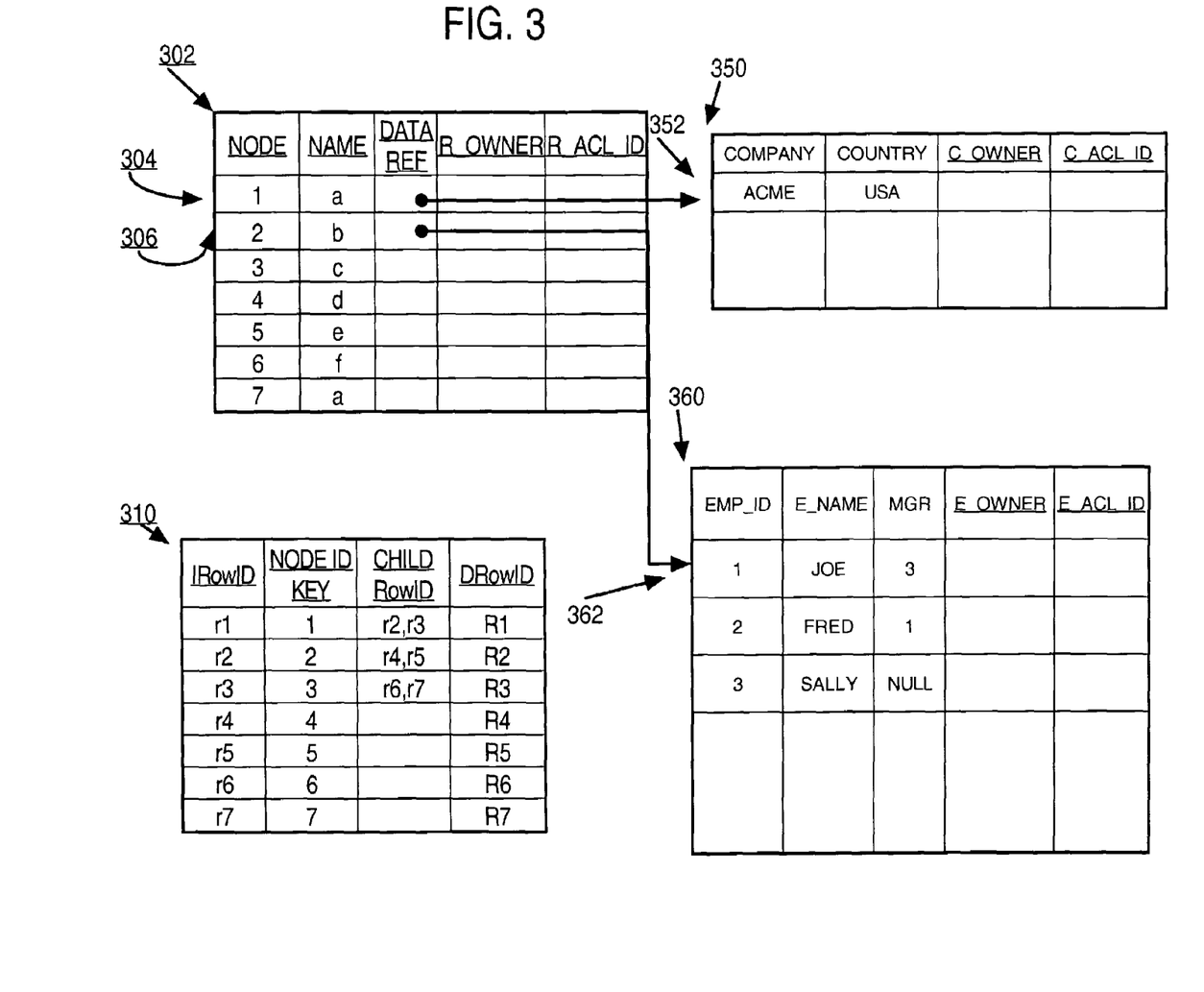
FIG. 3 is a block diagram illustrating content tables and hierarchy structure tables according to an embodiment of the present invention.

FIG. 3 is a block diagram of resource table 302 and index 310, which are hierarchy structures, and tables 350 and 360, which are content structures. Table 302 and index 310 capture information about the hierarchy 100 in a relational format and tables 350 and 360 capture the contents of the nodes in hierarchy 100.

Table 302 includes one row for each node in hierarchy 100. For a given node, column NODE contains a logical identifier (herein "node id") that uniquely identify a node in hierarchy 100. Column NODE may be a primary key that contains primary key values. Column NAME contain a value representing names of a node.

The column DATA REF stores a reference to a resource associated with the node identified in the row. As used herein, the term "resource" refers to a content structure and element thereof (e.g. a row of a table) that is associated with a node; the term "reference" generally refers to any data used to locate other data, including, but not limited to, other data in the database system. For example, the DATA REF column can store pointers, or more complex information such as the "ref" data type supported by Oracle database systems. The present invention is not limited to any particular type of data for locating the resources associated with nodes in a hierarchy.

For example, row 304, corresponds to node 1, contains the name "a", and refers to a resource in the form of company record 352, which holds content of node 1. Record 352 is stored in table 350, which has columns for each of the fields of a company record. Row 306 corresponds to node 2, contains the name "b", and refers to employee record 362, which holds content of node 2. Employee record 362 is stored in table 360, which has columns for each of the fields of an employee record.

For purposes of exposition, some structure in resource table 302 is not depicted in FIG. 3. An implementation of a resource table may include more columns. For example, a resource table may contain a column DATA TYPE that stores data that indicates the type of resource associated with the node identified in the row. In addition, resources may be types of entities other than rows of a table. A resource can be a data file that contains data that conforms to XML (Extended Mark-up Language). A row in resource table 302 for such a resource would include data in DATA TYPE indicating that the resource is a file, and a reference in DATA REF that identifies the file and/or its location. A more detailed description of an implementation of a resource table can be may found in U.S. patent application Ser. No. 10/260,384, filed on the equal day herewith, entitled PROVIDING A CONSISTENT HIERARCHICAL ABSTRACTION OF RELATIONAL DATA, by Nipun Agarwal, Eric Sedlar, Ravi Murthy and Namit Jain.

Hierarchical index 310 describes the hierarchical relationship of hierarchy 100. Index 310 is a table where each row is an index entry. For a given node in hierarchy 100, its corresponding entry in index 310 identifies the index entries of the child nodes of the given node. The entry also identifies the row in table 302 corresponding to the given node. More details of a hierarchical index, such as hierarchical index 310, are found in U.S. patent application Ser. No. 10/260, 381, filed on the equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

Replicated Access Control Columns

Figure 4:
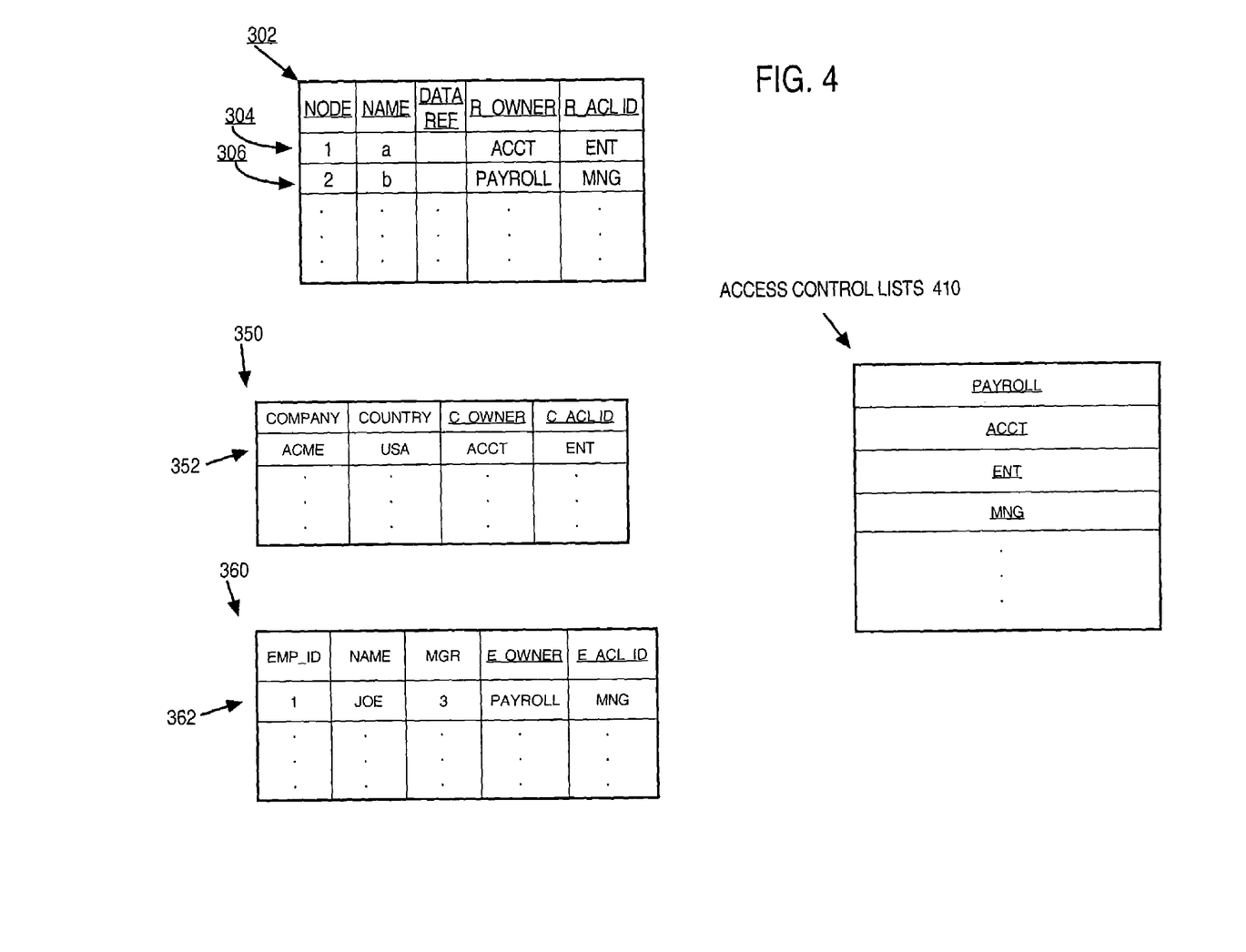
FIG. 4 is a block diagram of content tables showing access control columns that contain access control data that reflects other access control data stored in hierarchical tables according to an embodiment of the present invention.

FIG. 4 shows in greater detail columns in tables 302, 350, and 360 that contain access control data. As shown below, for the set of records in tables 350 and 360 and the corresponding set of rows in resource table 302, access control data contained therein reflect the same user privileges, thereby enabling uniform access control.

Resource table 302 includes columns R_OWNER and R_ACL_ID, which contain identifiers that identify an entry in access control lists 410. For a given row in table 302, an identifier in R_OWNER identifies the access control list that lists one or more users or groups of users that own the corresponding resource in hierarchy 200. Owners of resources have extensive user access privileges, typically including the right to read and write a resource, and to delete the resource. R_ACL_ID identifies an access control list of other users or groups of users who may access the resource, and the particular user access privileges they have. For example, for row 304, R_OWNER identifies access control list ACCT, which lists a user that is the owner of record 352; R_ACL_ID identifies access control list ENT, which specifies a list of users who may read from but not write in record 352. For row 306, R_OWNER identifies access control list PAYROLL, which lists users that are owners of record 362; R_ACL_ID identifies access control list MNG, which specifies a list of users who may read from and write to record 362.

Table 350 includes columns C_OWNER and C_ACL_ID, which contain identifiers that identify an entry in access control lists 410. For a given record in table 350, an identifier in C_OWNER identifies the access control list that lists one or more users or groups of users that own the record; C_ACL_ID identifies an access control list of other users or groups of users who may access the record. For a record in table 350 and its corresponding row in table 302, C_OWNER and C_ACL_ID and R_OWNER and R_ACL_ID contain the same access control data, respectively. For example, for record 352 and row 304 in resource table 302, C_OWNER identifies access control list ACCT and C_ACL_ID identifies access control list ENT, the same as R_OWNER and R_ACL_ID, respectively.

Table 360 includes columns E_OWNER and E_ACL_ID, which contain identifiers that identify an entry in access control lists 410. For a given record in table 360, an identifier in E_OWNER identifies the access control list that lists one or more users or groups of users that own the record; E_ACL_ID identifies an access control list of other users or groups of users who may access the record. For a record in table 360 and its corresponding row in table 302, E_OWNER and E_ACL_ID and R_OWNER and R_ACL_ID contain the same access control data, respectively. For example, for record 362 and row 306 in resource table 302, E_OWNER identifies access control list ACCT and E_ACL_ID identifies access control list ENT, the same as R_OWNER and R_ACL_ID, respectively.

Adding Predicates that Provide Uniform Access Control

When content tables 350 and 360 are accessed through relational access mechanisms 210, it uses access control data in the tables to determine whether the particular type of access may be granted. Storing access control in content tables 350 and 360 allows user access privileges to be determined more efficiently because the access control data is available in the rows to be accessed, eliminating the need to get the access control data from another source, such as access control columns in resource table 302.

Typically, access through relational access mechanisms involves processing database statements issued by the users. For these situations, predicates may be dynamically appended to statements, where the predicates define conditions that dictate whether access to a particular row in a content table may be permitted. Examples of such a mechanism are described in (1) U.S. patent application Ser. No. 09/167,092, entitled DATABASE FINE-GRAINED ACCESS CONTROL, filed on Oct. 5, 1998 by Chon Hei Lei and Douglas James McMahon, incorporated by reference as originally set forth herein, and (2) U.S. patent application Ser. No. 09/589,602, entitled PARTITIONED ACCESS CONTROL TO A DATABASE, filed on Jun. 7, 2000 by Daniel ManHung Wong and Chon Hei Lei, incorporated by reference as originally set forth herein.

For example, a database server receives a request to process the following database statement, query A, in which table 360 is referenced as a table EMP.

select * from EMP

The database server detects that the query accesses table EMP, and in response, examines database metadata for EMP, and determines that the metadata defines a "policy function", which when invoked by the database server, returns an expression. The expression is appended to query A to generate the transformed query B, shown below.

select * from EMP where checkacl(E_OWNER, E_ACL_ID, 'read')

The first parameter of checkacl is for a value from column E_OWNER, the second for a value from column E_ACL_ID. The third parameter specifies a particular user access privilege. When the function is invoked for a particular row in table 360, the values in columns E_OWNER and E_ACL_ID are passed to function checkacl. The function determines whether the access control list referred to by the first parameter identifies the user as an owner. If so, the function returns TRUE, thereby permitting access to the row. If not, the function determines whether the access control list referred to by the second parameter refers to an access control list that identifies a user having the right for the type of access referred to by the third parameter. If so, the function returns TRUE.

The value of the third parameter depends on the type of operation specified by the transformed database statement. For example, if the operation is a query, then the value is 'read', if the operation is a DML operation such as update, then the value is 'write'.

Creating Content Structures that Contain Access Control Columns

According to an embodiment of the present invention, content tables are created as relational or object-relational tables without access control columns in response to receiving a DDL command requesting creation of the tables. The access control columns are defined for content tables when the tables are incorporated into the hierarchy by the database server using database server mechanisms that incorporate content tables into hierarchies. Once incorporated, the database server executes maintenance operations, which maintain data in the access control columns of the content tables in such a way that the data reflects the user access privileges defined by access control data in the hierarchy structures for the resources in the content tables. An example of a database server configured to incorporate tables as content tables in a hierarchy and maintain the access control columns in the tables are described in U.S. patent application Ser. No. 10/260,384, filed on the equal day herewith, entitled PROVIDING A CONSISTENT HIERARCHICAL ABSTRACTION OF RELATIONAL DATA, by Nipun Agarwal, Eric Sedlar, Ravi Murthy and Namit Jain.

Such a database server is configured to perform an operation for incorporating a relational table automatically in response to receiving (1) information that identifies the content structure, and (2) connecting criteria that indicates criteria for establishing parent-child relationships between the resources contained in the specified content structure. In response to receiving such information, the database server defines and creates database objects needed to maintain consistency between data in the content structures and in the hierarchy structures. Such database objects include access control columns for the content tables, and DML (Data Definition Language) triggers for content tables. The triggers ensure that operations performed in the content tables through relational access mechanisms 210 are reflected in the hierarchy structures. For example, if a new record is inserted into content table 360, a trigger is invoked. The trigger inserts a corresponding new row into resource table 302. The values in R_OWNER and R_ACL_ID are set equal to the values in E_OWNER and E_ACL_ID, respectively.

In addition, hierarchical access mechanisms 220 ensure updates made to access control columns in resource table 302 are consistently reflected in access control columns of content tables. For example, if hierarchical access mechanism 220 changes the value in R_ACL_ID for row 306 from MNG to ENT, it uses the reference in DATA_REF referring to record 362 to the change value in E_ACL_ID from MNG to ENT.

Support for Multiple and External User Security Models

The term user security model refers to data that is used to model users and their user access privilege. For example, a user security model illustrated herein is one based on (1) access control lists that define users and their user access privileges, and (2) access control list identifiers that reside in an access control column to associate a resource with a particular set of users that have a particular set of user access privileges for the resource. Other implementations may use other types of user security models, including ones not managed internally by a database server, such as LDAP or user security models used by operating systems.

For example, access control columns may contain identifiers that identify a set of users defined by an LDAP server. To determine whether a user may access a particular node, the database server may first determine whether an identifier in an access control column identifies an access control list. If not, the database server may then transmit a request to an LDAP server requesting that the LDAP server determine whether the user belongs to a group of users identified by the identifier, and if so, what the user's access privileges are.

Hardware Overview

Figure 5:
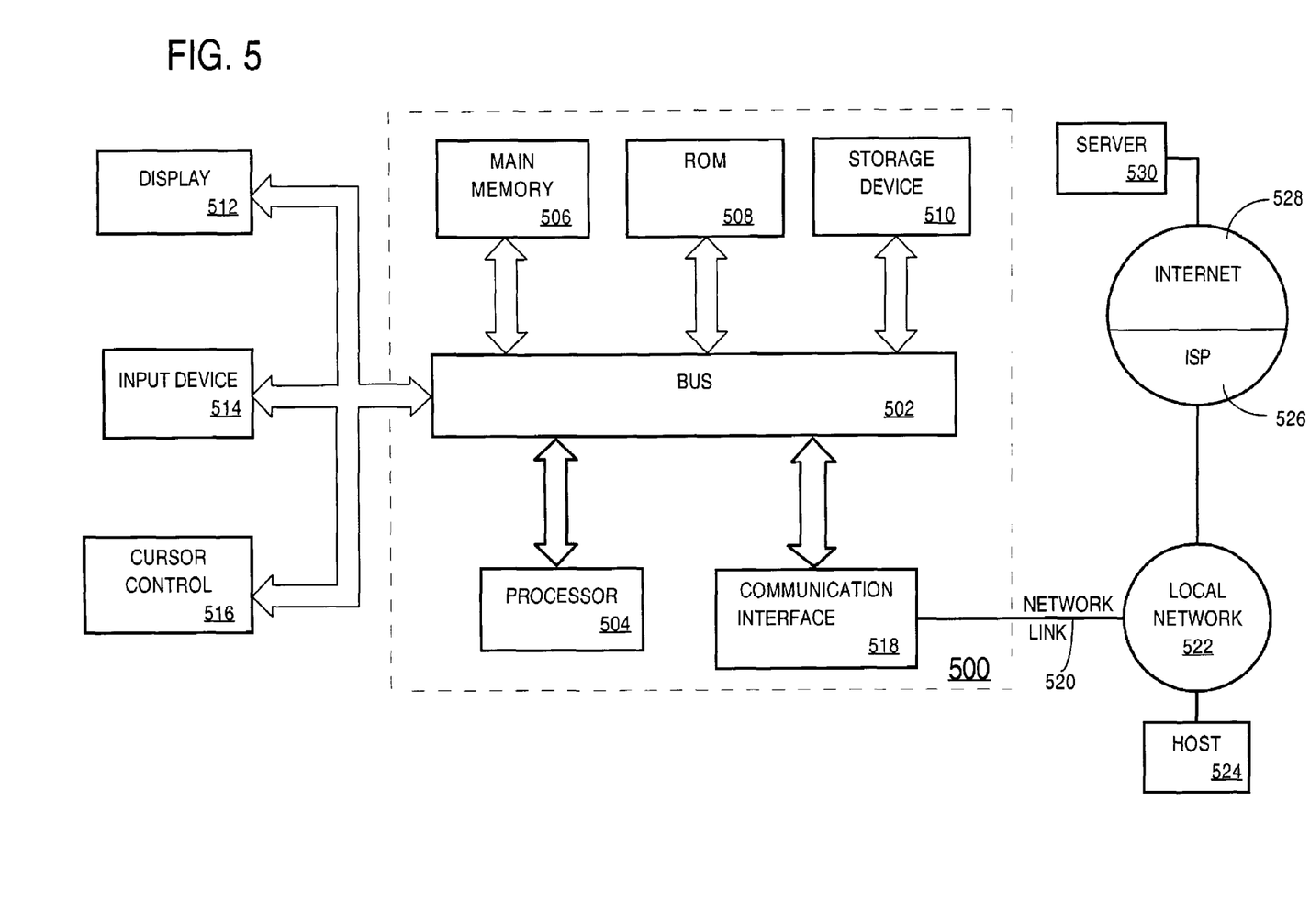
FIG. 5 is a block diagram of a system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing data in a database system, comprising the steps of:
   storing, in content structures, first resources that belong to an information hierarchy and first access control data used to define user access privileges for accessing said first resources;
   storing, in a set of hierarchy structures, information that defines hierarchical relationships within said information hierarchy and second access control data used to define user access privileges for accessing said first resources;
   maintaining said first access control data and said second access control data to maintain consistency between said first access control data and said second access control;
   wherein said content structures include a first set of database objects that contain at least a portion of said first resources and said first access control data;
   wherein said hierarchical structures include a second set of database objects, different than said first set of database objects, that contain at least a portion of said information that defines hierarchical relationships and said second access control data;
   wherein said first set of database objects are one or more first database objects defined by the database system; and
   wherein said second set of database objects are one or more second database objects defined said database system.

2. The method of claim 1, the steps further including:
   receiving a request that requests data based on a position of the data within said information hierarchy and that requires a particular type of access to said first resources; and
   determining whether the said particular type of access to said first resources is permitted based on said second access control data.

3. The method of claim 2, wherein:
   the first set of database objects contain one or more tables;
   the steps further include:
      receiving a request for data that references a first table of said content structures; and
      determining whether said particular type of access to the first table is permitted based on said first access control data.

4. The method of claim 1, wherein:
   the steps further include making a modification to said first access control data; and
   wherein the step of maintaining includes causing said second access control data to reflect said modification.

5. The method of claim 1, wherein:
   the steps further include making a modification to said second access control data; and
   wherein the step of maintaining includes causing said first access control data to reflect said modification.

6. The method of claim 1, wherein:
   said first set of database objects include a table managed by a database server; and
   wherein said first access control data is stored in one or more columns of said table.

7. The method of claim 6, wherein;
   said one or more columns include a column that contains data used to identify a set of users and their access privileges for a resource from said first resources.

8. The method of claim 1, wherein said first access control data references data managed by the database server to define user access privileges.

9. The method of claim 8, wherein said data managed by the database server includes access control lists managed by the database server.

10. The method of claim 1, wherein said second access control data references data managed by the database server to define user access privileges.

11. The method of claim 1, wherein:
   said first set of database objects include at least one table managed by a database server; and
   said first access control data references one or more sources external to said database system.

12. The method of claim 11, wherein:
   said first access control data includes identifiers that identify a set of users; and
   wherein information defining user access privileges of the set of users is managed by a server configured to support LDAP.

13. The method of claim 1, wherein said content structures include one of more data files that contain non-relational data.

14. A computer-readable medium carrying one or more sequences of instructions for managing data in a database system, wherein execution of the one or more sequences of instructions by one or more processors causes the one or more processors to perform the steps of:
   storing, in content structures, first resources that belong to an information hierarchy and first access control data used to define user access privileges for accessing said first resources;

storing, in a set of hierarchy structures, information that defines hierarchical relationships within said information hierarchy and second access control data used to define user access privileges for accessing said first resources;

maintaining said first access control data and said second access control data to maintain consistency between said first access control data and said second access control;

wherein said content structures include a first set of database objects that contain at least a portion of said first resources and said first access control data;

wherein said hierarchical structures include a second set of database objects, different than said first set of database objects that contain at least a portion of said information that defines hierarchical relationships and said second access control data;

wherein said first set of database objects are one or more first database objects defined by the database system; and wherein said second set of database objects are one or more second database objects defined said database system.

15. The computer-readable medium of claim 14, the steps further including:

receiving a request that requests data based on a position of the data within said information hierarchy and that requires a particular type of access to said first resources; and determining whether the said particular type of access to said first resources is permitted based on said second access control data.

16. The computer-readable medium of claim 15, wherein: the first set of database objects contain one or more tables; the steps further include:

receiving a request for data that references a first table of said content structures; and determining whether said particular type of access to the first table is permitted based on said first access control data.

17. The computer-readable medium of claim 14, wherein: the steps further include making a modification to said first access control data; and wherein the step of maintaining includes causing said second access control data to reflect said modification.

18. The computer-readable medium of claim 14, wherein: the steps further include making a modification to said second access control data; and wherein the step of maintaining includes causing said first access control data to reflect said modification.

19. The computer-readable medium of claim 14, wherein: said first set of database objects include a table managed by a database server; and wherein said first access control data is stored in one or more columns of said table.

20. The computer-readable medium of claim 19, wherein: said one or more columns include a column that contains data used to identify a set of users and their access privileges for a resource from said first resources.

21. The computer-readable medium of claim 14, wherein said first access control data references data managed by the database server to define user access privileges.

22. The computer-readable medium of claim 21, wherein said data managed by the database server includes access control lists managed by the database server.

23. The computer-readable medium of claim 14, wherein said second access control data references data managed by the database server to define user access privileges.

24. The computer-readable medium of claim 14, wherein: said first set of database objects include at least one table managed by a database server; and said first access control data references one or more sources external to said database system.

25. The computer-readable medium of claim 24, wherein: said first access control data includes identifiers that identify a set of users; and wherein information defining user access privileges of the set of users is managed by a server configured to support LDAP.

26. The computer-readable medium of claim 14, wherein said content structures include one of more data files that contain non-relational data.

* * * * *